(12) United States Patent
Attanasio et al.

(10) Patent No.: US 12,184,177 B2
(45) Date of Patent: Dec. 31, 2024

(54) DYNAMIC BIAS FOR BOOTSTRAP RECHARGE IN DISCONTINUOUS MODE DC-DC CONVERTERS

(71) Applicant: STMicroelectronics S.r.l., Agrate Brianza (IT)

(72) Inventors: Marco Attanasio, Olbia-Tempio (IT); Giovanni Bellotti, Turbigo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 185 days.

(21) Appl. No.: 17/979,156

(22) Filed: Nov. 2, 2022

(65) Prior Publication Data

US 2024/0146195 A1 May 2, 2024

(51) Int. Cl.
*H02M 1/08* (2006.01)
*H02M 3/158* (2006.01)

(52) U.S. Cl.
CPC ........... *H02M 3/1582* (2013.01); *H02M 1/08* (2013.01)

(58) Field of Classification Search
CPC .............................. H02M 3/1582; H02M 1/08
See application file for complete search history.

(56) References Cited

U.S. PATENT DOCUMENTS

| | | | |
|---|---|---|---|
| 8,072,202 B2 * | 12/2011 | Yang | H02M 3/1588 323/282 |
| 9,490,697 B2 | 11/2016 | Rolland | |
| 9,979,279 B2 | 5/2018 | Soldner et al. | |
| 10,079,538 B2 | 9/2018 | Zhao et al. | |
| 10,250,149 B2 | 4/2019 | Phadke | |
| 10,651,846 B2 * | 5/2020 | Fukushima | H03K 17/163 |
| 11,804,769 B2 * | 10/2023 | Jodka | H03K 17/687 |
| 2016/0276933 A1 * | 9/2016 | Saito | H03K 19/017509 |
| 2020/0106357 A1 | 4/2020 | Wiersch et al. | |
| 2021/0126537 A1 | 4/2021 | Lalithambika et al. | |

OTHER PUBLICATIONS

Texas Instruments: "LM5160-Q1 Wide Input 65-V, 2-A Synchronous Buck / Fly-Buck(tm) DC/DC Converter," SNVSAE4C, Jul. 2015, Revised Oct. 2018, 38 pgs.

* cited by examiner

*Primary Examiner* — Adolf D Berhane
(74) *Attorney, Agent, or Firm* — Crowe & Dunlevy LLC

(57) ABSTRACT

Disclosed herein is a DC-DC converter including a power section and a bootstrap circuit for driving the gate of the high-side transistor of the power section. The bootstrap circuit includes an adaptive clamp circuit that maintains a proper voltage differential across the bootstrap capacitor within the bootstrap circuit for recharge during off-times regardless of whether the mode of operation of the DC-DC converter continuous conduction mode (CCM), discontinuous conduction mode (DCM), or pulse-skip mode. This voltage differential is established as being between a bootstrap voltage and a voltage at a tap between the high and low side transistors of the power section. The adaptive clamp circuit maintains the bootstrap voltage as following the lesser of the output voltage and the voltage at the tap.

20 Claims, 8 Drawing Sheets

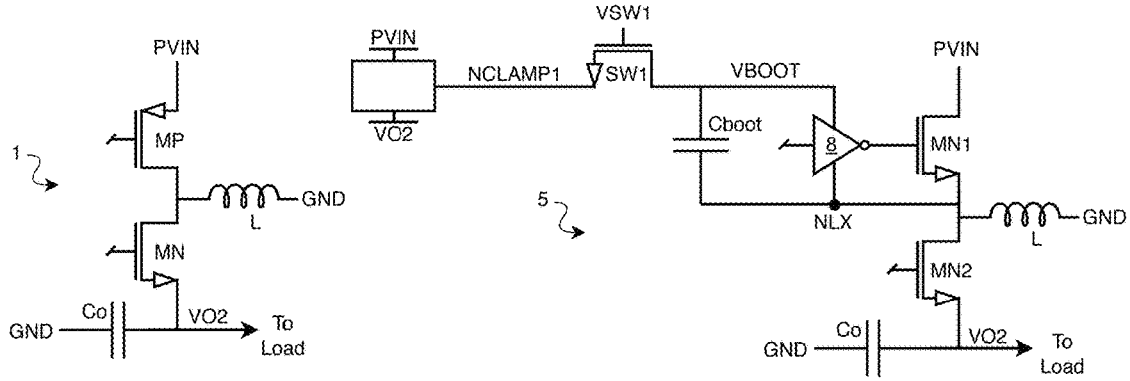
FIG. 1 (Prior Art)
FIG. 2 (Prior Art)
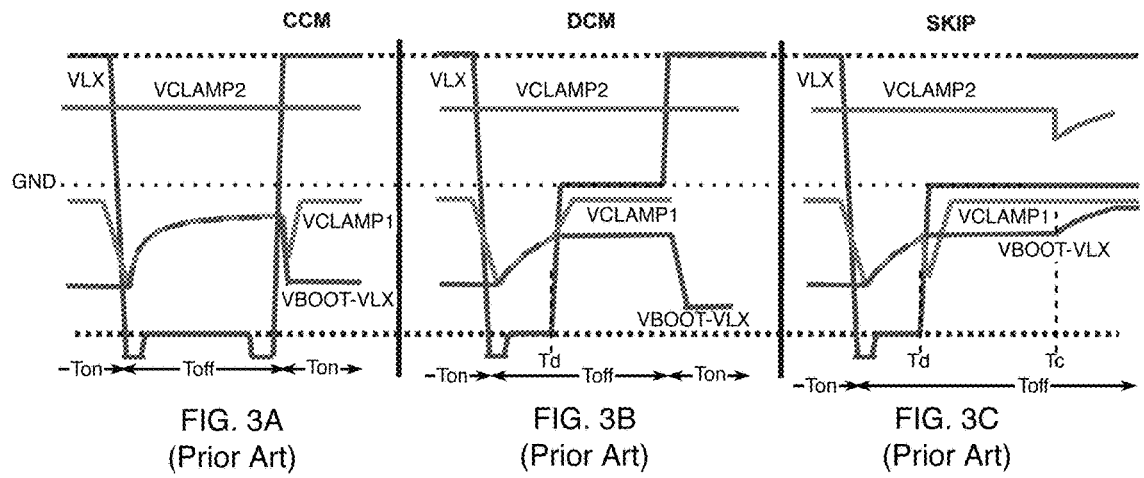
FIG. 3A (Prior Art)
FIG. 3B (Prior Art)
FIG. 3C (Prior Art)
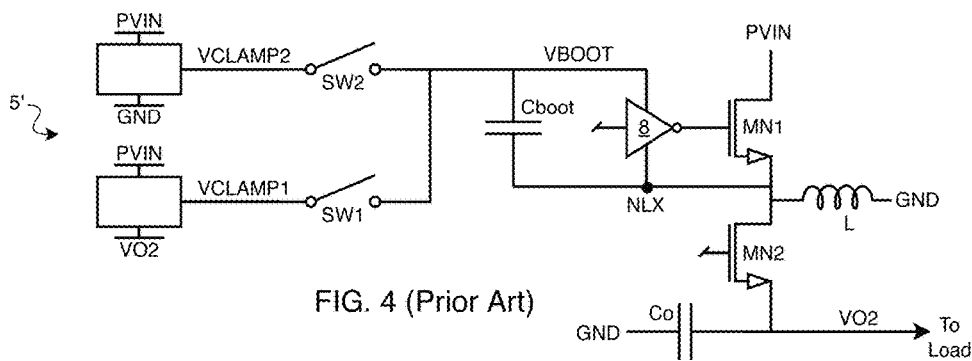
FIG. 4 (Prior Art)

DYNAMIC BIAS FOR BOOTSTRAP RECHARGE IN DISCONTINUOUS MODE DC-DC CONVERTERS

TECHNICAL FIELD

This application is directed to the field of DC-DC converters utilizing bootstrap circuits to enable the use of high-side NMOS power transistors and, in particular, to the generation of a dynamic bias for recharge of bootstrap capacitors in the bootstrap circuits during operation in discontinuous mode.

BACKGROUND

Switching DC-DC converters are used to generate an output DC voltage that is either greater than or less than an input DC voltage. Examples of switching DC-DC converters include: boost converters, which step-up the input DC voltage to produce a higher output DC voltage; buck converters, which step-down the input DC voltage to produce a lower output DC voltage; and buck-boost converters, which can either step-up or step-down the input DC voltage. In standard form, such converters produce the output DC voltage having the same polarity as the input DC voltage; in inverting form, such converters produce the output DC voltage having the opposite polarity to the input DC voltage.

A known inverse buck-boost converter 1 is shown in FIG. 1 and includes a high-side PMOS transistor MP and a low-side NMOS transistor MN connected in series between an input voltage node PVIN and an output voltage node VO2, with an inductor L being connected between the tap between the transistors and ground and an output capacitor Co across which the output voltage VO2 is formed.

During the portion of the switching cycle in which transistor MP is on (high-side conduction, during an on-time Ton), the inductor voltage is equal to PVIN. During the portion of the switching cycle during which transistor MN is on (low-side conduction, during an off-time Toff), the inductor voltage is equal to VO2. At this point the energy stored in the inductor is supplied to the load and the output capacitor Co. The output voltage VO2 is controlled by adjusting the duty cycle of the transistors MP and MN.

This known buck-boost design is effective for certain applications. The use of the PMOS transistor MP as the high-side transistor has certain advantages, one of which is that its gate can be driven with the input voltage PVIN. However, PMOS transistors are physically larger than NMOS transistors that are sized to pass an equivalent amount of current.

Therefore, in some instances, an alternative inverse buck-boost converter design may be utilized in which the high-side transistor is an NMOS transistor. Such an example is shown in the inverting buck-boost converter 5 of FIG. 2. The challenge with this design is that the gate of the high-side NMOS transistor MN1 is to be driven with PVIN+Vth (Vth being the threshold voltage of the high-side NMOS transistor MN1), and therefore a step-up circuit referred to as a bootstrap circuit is to be included within the design to generate such voltage.

The inverse buck-boost converter 5 may be operated in continuous conduction mode (CCM), discontinuous conduction mode (DCM), or pulse-skip mode. In CCM, the inductor current in the energy transfer remains non-zero, while in the case of DCM, the inductor current falls to zero. In pulse-skip mode, DCM operation is performed, with certain on-times Ton being skipped (not occurring).

In CCM, during off-times Toff, the transistor MN2 is kept on and a bootstrap capacitor Cboot is charged so that during on-times Ton the capacitor Cboot can be utilized to power a gate driver 8 which in turn generates a gate drive signal that adequately turns on the transistor MN1, such gate drive signal having a voltage of PVIN+Vth. Specifically, the gate driver 8 is powered between voltage VBOOT (held by the bootstrap capacitor Cboot) and the voltage VLX at node NLX, and therefore VBOOT-VLX is to be Vth. During off-times Toff, the voltage VLX is equal to VO2. A clamped voltage VCLAMP1 is generated by a first clamp circuit to be ~5V above VO2 in magnitude and used in forming VBOOT across the capacitor Cboot. As can be seen in the graph of FIG. 3A, during off-times Toff, VLX=VO2, so VBOOT=VO2+VCBOOT where VCBOOT is the voltage difference across the top and bottom plates of the capacitor Cboot. Transistor SW1, connecting NCLAMP1 and VBOOT, is turned on so that VBOOT=NCLAMP1. Thus, the bootstrap capacitance is recharged at a voltage VCBOOT=NCLAMP1-VO2. This is effective and therefore enables proper operation of the inverting buck-boost converter 5 during CCM.

However, consider now the case of operation in DCM. In DCM, during off-times Toff, once transistor MN2 is turned off, the inductor current reaches zero, with the result being that the voltage VLX rises to ground, as can be seen in the graph of FIG. 3B. When VLX is higher than VO2, NCLAMP1 and VBOOT cannot be connected, with VBOOT being higher (in magnitude) than NCLAMP1. This means that VBOOT-VLX falls, because VCLAMP1 is 5V above VO2 in magnitude and not 5V above ground in magnitude. As a result, in DCM once the transistor MN2 is turned off at time Td, charging of the bootstrap capacitor Cboot would effectively stop, as can be seen in FIG. 3B (ignoring for the moment the VCLAMP2 trace). As a result, the gate voltage generated by the gate driver 8 during the next on-time Ton would be less, the transistor MN1 would not turn fully on during high-side conduction, and the desired output voltage VO2 would accordingly not be achieved.

Operation in pulse-skip mode would yield the same issue when the transistor MN2 is turned off during off-times Toff, as can be seen in FIG. 3C (ignoring for the moment the VCLAMP2 trace).

In an attempt correct this issue with DCM and pulse-skip mode, the further design of the inverse buck-boost converter 5' of FIG. 4 has been developed. This design utilizes two clamp circuits to generate two clamp voltages VCLAMP1, VCLAMP2. The first clamp voltage VCLAMP1 is charged to be ~5V above VO2 in magnitude, and the second clamp voltage VCLAMP2 is charged to be ~5V above ground in magnitude. In CCM, switch SW1 is closed during Toff while switch SW2 is opened to connect the first clamp voltage VCLAMP1 to the bootstrap capacitor Cboot. In DCM and pulse-skip mode, when transistor MN2 is on, SW1 is on and SW2 is off, in the same way as in CCM.

When both low side and high side transistors MN2 and MN1 are off (i.e., the half bridge is in a high impedance state) because the inductor current has reached 0 level, VLX rises from VO2 to GND. Therefore, SW1 is turned off while SW2 is turned on to connect VCLAMP2 with VBOOT. Since the second clamp voltage VCLAMP2 is generated so as to be ~5V above ground, when both transistors MN1, MN2 turn off during off-times Toff and VLX rises to ground, VBOOT-VLX is still ~5V, maintaining proper powering of the gate driver 8 and in turn proper generation of the gate drive signal for the transistor MN1.

This design does in fact correct the issue to an extent in pulse-skip mode. See FIG. 3C in which, during the off-time Toff at time Td, the transistor MN2 is switched off and VBOOT-VLX remains generally flat until time Tc, then begins to rise again at time Tc. The reason for this period of flatness is that the elapsed time between time Td and time Tc represents the delay for switch SW1 to be opened and switch SW2 to be closed—this delay is inherent to the control scheme and the devices used to form the switches SW1 and SW2. Appreciating this, it can be seen that in FIG. 3B, there is not sufficient time in DCM between time Td and the beginning of the next on-time Ton to open switch SW1 and close switch SW2 (in certain operating conditions). As a result, the bootstrap capacitor Cboot ceases to be charged at time Td, the gate voltage generated by the gate driver 8 during the next on-time Ton would be less, the transistor MN1 would not turn fully on during high-side conduction, and the desired output voltage VO2 would accordingly not be achieved.

Given this, the design of FIG. 4 is insufficient for operation in certain conditions in DCM. Moreover, the use of multiple clamp circuits consumes area and increase complexity. Therefore, further development into this area is needed.

SUMMARY

Disclosed herein is a DC-DC converter, including: a power section including at least a high-side transistor and a low-side transistor coupled in series between an input voltage node and an output voltage node, wherein the high-side transistor has a gate that is driven by a gate drive voltage; and a bootstrap circuit.

The bootstrap circuit includes: a gate driver having a power supply terminal coupled to a bootstrap output node and a reference supply terminal coupled to a tap node between the high-side transistor and the low-side transistor, the gate driver configured to receive a high-side control signal and generate the gate drive voltage in response thereto; a bootstrap capacitor coupled between the bootstrap output node and the tap node; a clamp circuit configured to set an intermediate voltage at a first intermediate node to be equal to a lesser of a tap voltage at the tap node and an output voltage at the output voltage node; a current source configured to source a reference current to a control node; a voltage drop circuit coupled between the control node and the first intermediate node, the voltage drop circuit generating a control voltage at the control node as a function of the intermediate voltage; a source follower configured to buffer the control voltage to a second intermediate node; and a bootstrap output transistor coupled between the second intermediate node and the bootstrap output node, the bootstrap output transistor arranged so as to set a bootstrap voltage across the bootstrap capacitor to be equal to a target voltage that is referenced to the tap voltage.

Control circuitry is configured to generate the high-side control signal, a low-side control signal for the low-side transistor, and a clamp control signal for the clamp circuit so as to operate the DC-DC converter to generate the output voltage at the output voltage node from an input voltage at the input voltage node.

The clamp circuit may include: a first n-channel transistor having a drain coupled to the tap node, a source coupled to the first intermediate node, and a gate coupled to the first intermediate node; and a second n-channel transistor having a drain selectively coupled to output voltage node by a switch, a source coupled to the first intermediate node, and a gate coupled to the first intermediate node, wherein the switch is controlled by the clamp control signal so that the switch is opened during off-times in discontinuous conduction mode (DCM) and pulse skip mode (PSM) but closed during off-times in continuous conduction mode (CCM) and during on-times in DCM, PSM, and CCM.

The voltage drop circuit may include: a Zener diode having a cathode coupled to the control node, and an anode; and a diode coupled transistor coupled between the anode of the Zener diode and the first intermediate node.

The clamp circuit may include: a first p-channel transistor having a drain coupled to the first intermediate node, a gate coupled to the tap node, and a source coupled to a cathode of a first Zener diode, with an anode of the first Zener diode being coupled to the tap node; a second p-channel transistor having a drain coupled to the first intermediate node, a gate coupled to an anode of a second Zener diode, and a source coupled to a cathode of the second Zener diode; and a switch coupled between the anode of the second Zener diode and the output voltage node, wherein the switch is controlled by the clamp control signal so that the switch is opened during off-times in discontinuous conduction mode (DCM) and pulse skip mode (PSM) but closed during off-times in continuous conduction mode (CCM) and during on-times in DCM, PSM, and CCM.

The voltage drop circuit may include a diode coupled transistor coupled between the control node and the first intermediate node.

The current source may include: a reference current sink configured to sink the reference current; and a current mirror having an input from which the reference current is sunk and an output coupled to the control node so that the reference current is sourced to the control node.

The source follower may include an n-channel transistor having a drain coupled to the input voltage node, a source coupled to the second intermediate node, and a gate coupled to the control node.

The source of the n-channel transistor may be coupled to the first intermediate node through a diode circuit connected between the first intermediate node and the second intermediate node. A resistor may be coupled between the first intermediate node and the second intermediate node.

The diode circuit may include: a first Zener diode having an anode coupled to the second intermediate node; a second Zener diode having an anode coupled to a cathode of the first Zener diode; and a third Zener diode having a cathode coupled to a cathode of the second Zener diode and an anode coupled to the first intermediate node.

The power section may include an inductor coupled between the tap node and ground such that the power section forms an inverting buck-boost converter.

The bootstrap output transistor may be an n-channel transistor having a source coupled to the second intermediate node, a drain coupled to the bootstrap output node, and a gate coupled to the second intermediate node.

Also disclosed herein is a DC-DC converter, including: a power section including at least a high-side transistor and a low-side transistor coupled in series between an input voltage node and an output voltage node, wherein the high-side transistor has a gate that is driven by a gate drive voltage; and a bootstrap circuit.

The bootstrap circuit includes: a gate driver having a power supply terminal coupled to a bootstrap output node and a reference supply terminal coupled to a tap node between the high-side transistor and the low-side transistor, the gate driver configured to receive a high-side control signal and generate the gate drive voltage in response thereto; a bootstrap capacitor coupled between the bootstrap output node and the tap node; a clamp circuit coupled between a power supply node and the input voltage node, the clamp circuit configured to set an input voltage at the input voltage node to be equal to a target voltage that is referenced to a tap voltage at the tap node; a current source configured to source a reference current to a control node; a voltage drop circuit coupled between the control node and a first intermediate node, the voltage drop circuit generating a control voltage at the control node as a function of an intermediate voltage at the first intermediate node; and a transistor coupled between the input voltage node and the first intermediate node, with a control terminal of the transistor being coupled to the control node.

Control circuitry may be configured to generate the high-side control signal and a low-side control signal for the low-side transistor so as to operate the DC-DC converter to generate the output voltage at the output voltage node from an input voltage at the input voltage node.

The clamp circuit may include an n-channel transistor having a source coupled to the power supply node, a drain coupled to the input voltage node, and a gate coupled to the power supply node.

The voltage drop circuit may include: a Zener diode having a cathode coupled to the control node, and an anode; and a diode coupled transistor coupled between the anode of the Zener diode and the first intermediate node.

The current source may include: a reference current sink configured to sink the reference current; and a current mirror having an input from which the reference current is sunk and an output coupled to the control node so that the reference current is sourced to the control node.

The transistor within the bootstrap circuit may be an n-channel transistor having its drain coupled to the input voltage node, its source connected to the bootstrap output node, and its gate coupled to the control node.

The source of the n-channel transistor may be coupled to the first intermediate node through a diode circuit connected between the first intermediate node and the bootstrap output node. A resistor may be coupled between the first intermediate node and the bootstrap output node.

The diode circuit may include: a first Zener diode having an anode coupled to the bootstrap output node; a second Zener diode having an anode coupled to a cathode of the first Zener diode; and a third Zener diode having a cathode coupled to a cathode of the second Zener diode and an anode coupled to the first intermediate node.

The power section may include an inductor coupled between the tap node and ground such that the power section forms an inverting buck-boost converter.

Also disclosed herein is a method of operating a DC-DC converter, including generating high-side and low-side control signals for high-side and low-side transistors of a power section so as to convert an input DC voltage to an output DC voltage. Generating the high control signal may be performed by during on-times of the DC-DC converter during which the high-side transistor is on, powering a gate driver with a bootstrap capacitor and generating the high-side control signal with the gate driver. During off-times of the DC-DC converter during which the high-side transistor is off, the method includes recharging the bootstrap capacitor by: establishing a voltage differential across the bootstrap capacitor as a difference between a bootstrap voltage and a voltage at a tap between the high-side and low-side transistors of the power section; and causing the bootstrap voltage to follow a lesser of the output DC voltage and the voltage at the tap during the off-times so that the voltage differential remains sufficient to suitably charge the bootstrap capacitor.

BRIEF DESCRIPTION OF THE DRAWINGS

FIG. 1 is a schematic diagram of a known inverse buck-boost DC-DC converter utilizing a high-side PMOS transistor.

FIG. 2 is a schematic diagram of a known inverse buck-boost DC-DC converter utilizing a high-side NMOS transistor, with a bootstrap circuit being used to generate the gate voltage for the high-side NMOS transistor.

FIG. 3A is a graph showing voltages of the converter of FIG. 2 in operation in continuous conduction mode.

FIG. 3B is a graph showing voltages of the converter of FIG. 2 in operation in discontinuous conduction mode.

FIG. 3C is a graph showing voltages of the converter of FIG. 2 in operation in pulse-skip conduction mode.

FIG. 4 is a schematic diagram of another known inverse buck-boost DC-DC converter utilizing a high-side NMOS transistor, with a bootstrap circuit being used to selectively generate different gate voltages for the high-side NMOS transistor dependent upon mode of operation.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein. Do note that in the below description, any described resistor or resistance is a discrete device unless the contrary is stated, and is not simply an electrical lead between two points. Thus, any described resistor or resistance coupled between two points has a greater resistance than a lead between those two points would have, and such resistor or resistance cannot be interpreted to be a lead. Similarly, any described capacitor or capacitance is a discrete device unless the contrary is stated, and is not a parasitic unless the contrary is stated. Moreover, any described inductor or inductance is a discrete device unless the contrary is stated, and is not a parasitic unless the contrary is stated.

Figure 5:
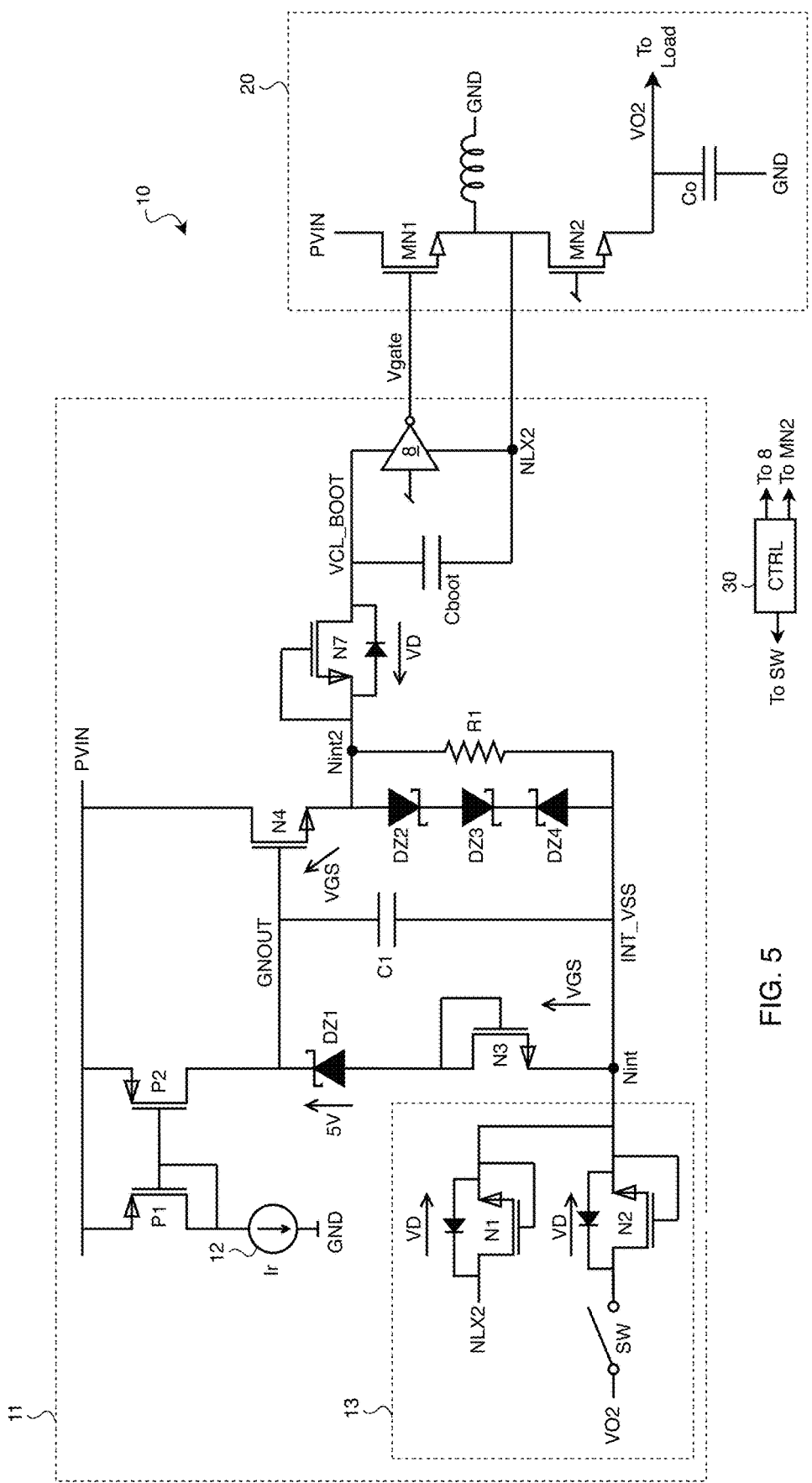
FIG. 5 is a schematic diagram of an inverse buck-boost DC-DC converter disclosed herein utilizing a high-side NMOS transistor, with a newly designed bootstrap circuit being used to generate the gate voltage for the high-side NMOS transistor.

Now described with reference to FIG. 5 is an inverse buck-boost DC-DC converter described herein. The DC-DC converter 10 includes a power section 20 that converts an input DC voltage PVIN to an output DC voltage VO2. The power section 20 includes: an n-channel transistor MN1 having its drain coupled to receive the input DC voltage PVIN, its source connected to a first terminal of an inductor L, and its gate coupled to receive a gate drive voltage Vgate; and an n-channel transistor MN2 having its drain connected to the source of MN1 and its source coupled to the output. An output capacitor Co is connected between the source of the transistor MN2 and ground, and the output voltage VO2 is formed across the output capacitor Co.

The gate drive voltage Vgate is generated by a bootstrap circuit 11. The bootstrap circuit 11 is now described, and includes a current mirror formed by p-channel transistors P1 and P2. In particular, transistor P1 has its source coupled to the input DC voltage PVIN, its drain connected to a current sink 12 that sinks a current Ir therefrom, and its gate connected to the gate of P2. Transistor P2 has its source coupled to the input DC voltage PVIN, its drain connected to the cathode of Zener diode D1, and its gate connected to the gate of transistor P1. The gate and drain of transistor P1 are connected, facilitating the current mirror arrangement with transistor P2.

The Zener diode DZ1 has its cathode connected to the drain of transistor P2 and its anode coupled to intermediate node Nint through diode coupled transistor N3. A capacitor C1 is connected between the cathode of DZ1 and node Nint. An n-channel transistor N4 has its drain connected to the input DC voltage PVIN and its source coupled, through node Nint2, to node Nint through Zener diodes DZ2, DZ3, DZ4. Zener diode DZ2 has its anode connected to node Nint2 and its cathode connected to the anode of Zener diode DZ3, which in turn has its cathode connected to the cathode of Zener diode DZ4. The anode of Zener DZ4 is connected to node Nint. A resistor R1 is connected between node Nint2 and node Nint.

An n-channel transistor N7 has its source connected to node Nint2, its drain connected to the power supply terminal of gate driver 8, and its gate connected to its source. The reference supply terminal of gate driver 8 is connected to node NLX2. A bootstrap capacitor Cboot is connected between the power supply terminal and reference supply terminal of gate driver 8, and a voltage VCL_BOOT is formed across Cboot during operation. The gate drive voltage Vgate is generated by the gate driver 8 and, as stated, is used to drive the gate of n-channel transistor MN1 of the power section 20.

A clamp circuit 13 includes an n-channel transistor N1 having its source connected to node Nint, its drain coupled to node NLX2 to receive voltage VLX2, and its gate connected to its source. The clamp circuit 13 also includes an n-channel transistor N2 having its source connected to node Nint, its drain selectively coupled to the output to receive the output voltage VO2 through switch SW, and its gate connected to its source. As will be described in detail below, the purpose of the clamp circuit 13 is to set the voltage INT_VSS such that it follows the lesser of the voltages VO2 and VLX2 during operation.

Control circuitry 30 (e.g., a finite state machine) generates control signals for the gate driver 8, transistor MN2, and switch SW. Therefore, the control circuitry 30 serves to operate the DC-DC converter 10, for example selectively changing between continuous conduction mode (CCM), discontinuous conduction mode (DCM), and skip-mode dependent upon load conditions. Keep in mind that during CCM, each period is divided into two time intervals, namely the on-time Ton (e.g., where transistor MN1 is on and transistor MN2 is off) and the off-time Toff (e.g., where transistor MN1 is off and transistor MN2 is on). During DCM, each period is divided into three time intervals, namely the on-time Ton (e.g., where transistor MN1 is on and transistor MN2 is off), the off-time Toff (e.g., where transistor MN1 is off and transistor MN2 is on), and the high-impedance time Thiz (e.g., where both transistor MN1 and MN2 are off).

In operation, regardless of mode, during on-times Ton during which recharge is not occurring, the control circuitry 30 closes the switch SW, enabling the voltage INT_VSS to track the voltage VO2, facilitating proper operation of the power section 20 during on-times Ton. In particular, current Ir is injected through Zener diode DZ2 and diode coupled transistor N3 to node Nint, causing the voltage INT_VSS to rise. During on-times Ton, voltage VO2 is below voltage VLX2 in magnitude, therefore as the voltage INT_VSS rises to VO2+VD, the body diode of transistor N2 will activate, and current starts to flow from node Nint to the output VO2 through the body diode of transistor N2, clamping the voltage INT_VSS to VO2+VD. Due to the voltage formed across the Zener diode DZ1 (~5V) and the voltage formed across transistor N3 (~Vth, the NMOS threshold voltage), node Nint2 will therefore be set to ~5V+VO2+Vd+Vth, and the voltage VCL_BOOT in turn is set to ~5V. During Ton, VLX2=PVIN and VCL_BOOT is greater than VLX2 by construction. In most cases, Nint2=~5V+VO2+Vd+Vth is lower than PVIN. It follows that diode N7 is off and NINT2 is no longer connected to VCL_BOOT. The bootstrap capacitor Cboot will discharge as the driver 8 draws current as it generates the gate drive signal Vgate for the transistor MN1.

During off-times Toff in CCM, transistor MN2 is on while transistor MN1 is off, therefore node NLX2 is connected to VOT through transistor MN2. This means that the current Ir is injected through Zener diode DZ1 and diode coupled transistor N3 to node Nint, causing the voltage INT_VSS to rise. As the voltage INT_VSS rises to VLX2+VD, the body diode of transistor N1 will activate, and current starts to flow from node Nint to node NLX2 through the body diode of transistor N1, clamping the voltage INT_VSS to VLX2+VD. Due to the voltage formed across the Zener diode DZ1 (~5V), node Nint2 will therefore be set to VLX2+(~5V)+Vd, and the voltage VCL_BOOT-VLX2 in turn is set to ~5V. Overall therefore, the voltage VCL_BOOT is set to VLX2+(~5V), keeping in mind that during off-times Toff in CCM, VLX2≈VO2.

During high-impedance times Thiz in DCM and in pulse skip mode, the switch SW is opened by the control circuitry 30. This is because once low-side conduction ceases at the end of Toff, the output voltage VO2 keeps its current value while VLX2 moves to ground. Therefore, to enable the current to flow through the body diode of transistor N1 to node NLX2 (instead of flowing through the body diode of transistor N2 to the output VO2), switch SW is opened. Through this scheme, the voltage VLX2 rises and the voltage INT_VSS rises accordingly, therefore dynamically adapting to the voltage VLX2—thus the bootstrap voltage VCL_BOOT remains at VLX2+5V despite VO2 changing during operation.

Figure 6:
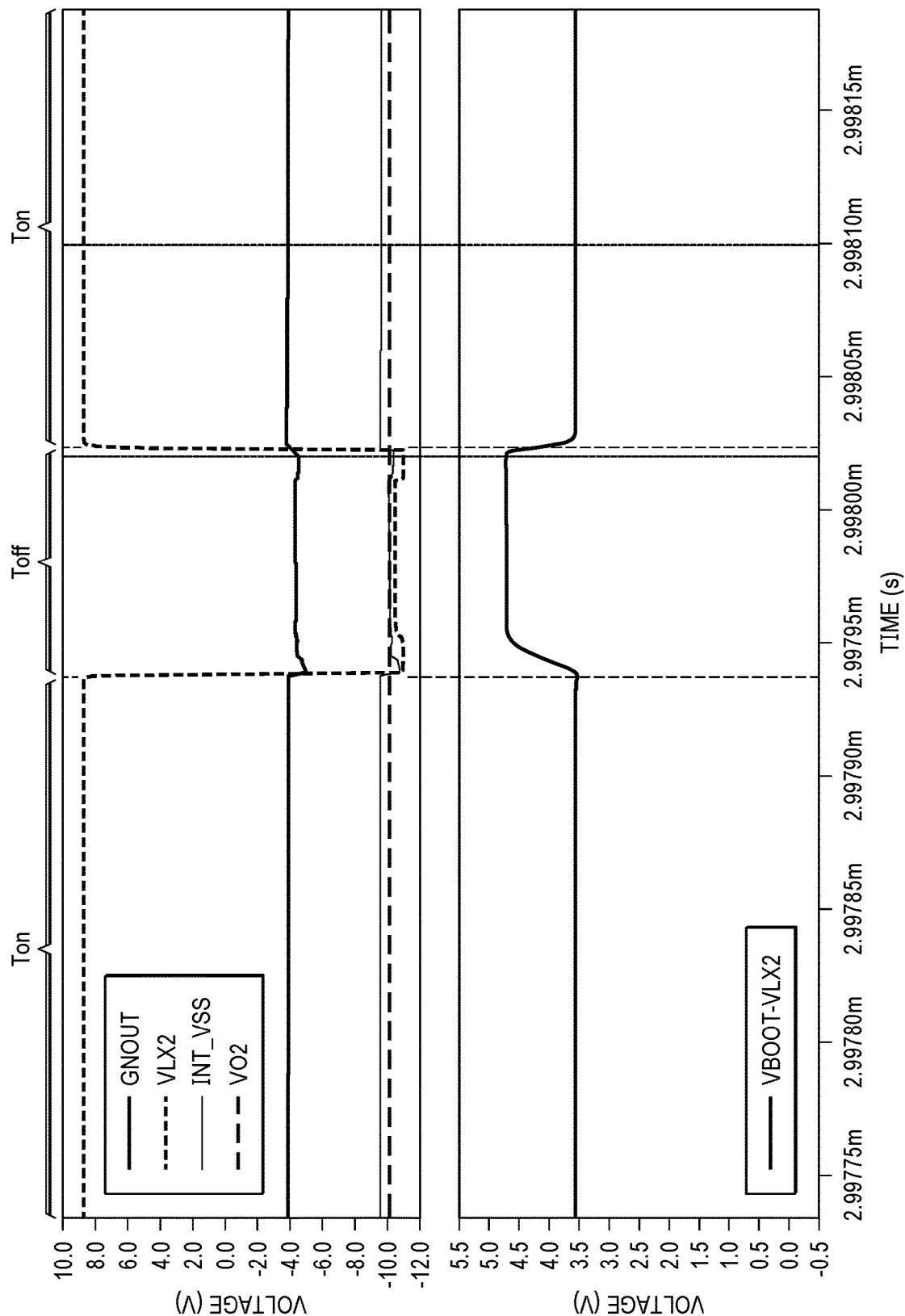
FIG. 6 is a graph showing voltages of the converter of FIG. 5 in operation in continuous conduction mode.

Graphs showing details of operation in a sample cycle in CCM may be found in FIG. 6. Observe that during the off-time Toff, the voltage INT_VSS remains approximately one diode's forward voltage (~0.7V) above the voltage VO2 in magnitude (keeping in mind that during off-times Toff in CCM, VLX2≈VO2) and therefore VBOOT-VLX2 remains at ~5V to properly charge the bootstrap capacitor Cboot.

Figure 7:
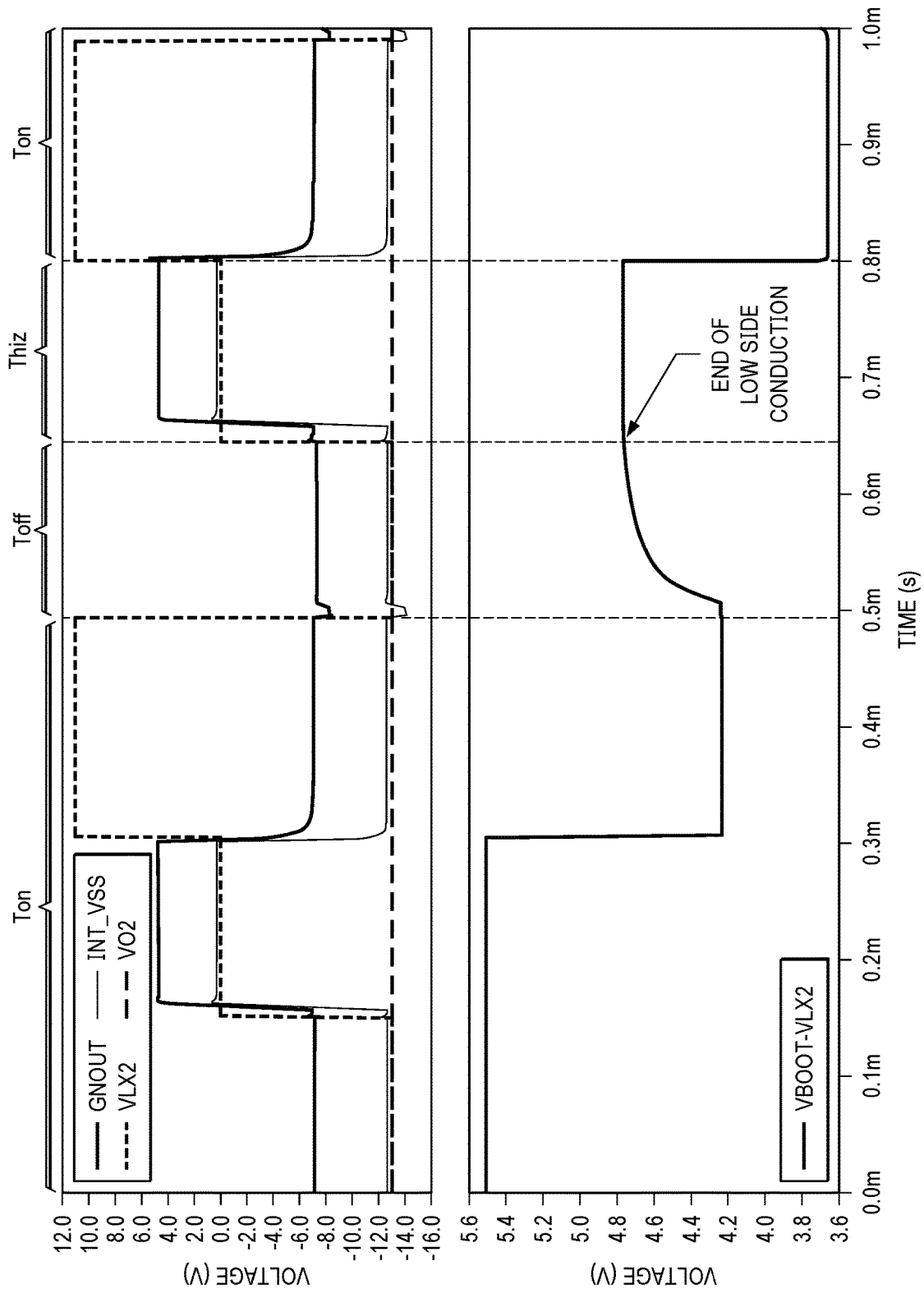
FIG. 7 is a graph showing voltages of the converter of FIG. 5 in operation in discontinuous conduction mode.

Graphs showing details of operation in a sample cycle in DCM may be found in FIG. 7. Observe that during the off-time Toff, the voltage INT_VSS remains approximately one diode's forward voltage (~0.7V) above the voltage VO2 in magnitude prior to end of low-side conduction. After the end of low-side conduction when the switch SW opens at the beginning of the high-impedance time Thiz, observe that the voltage INT_VSS remains approximately one diode's forward voltage (~0.7V) above the voltage VLX2 and therefore VBOOT-VLX2 remains at ~5V to properly charge the bootstrap capacitor Cboot.

Figure 8:
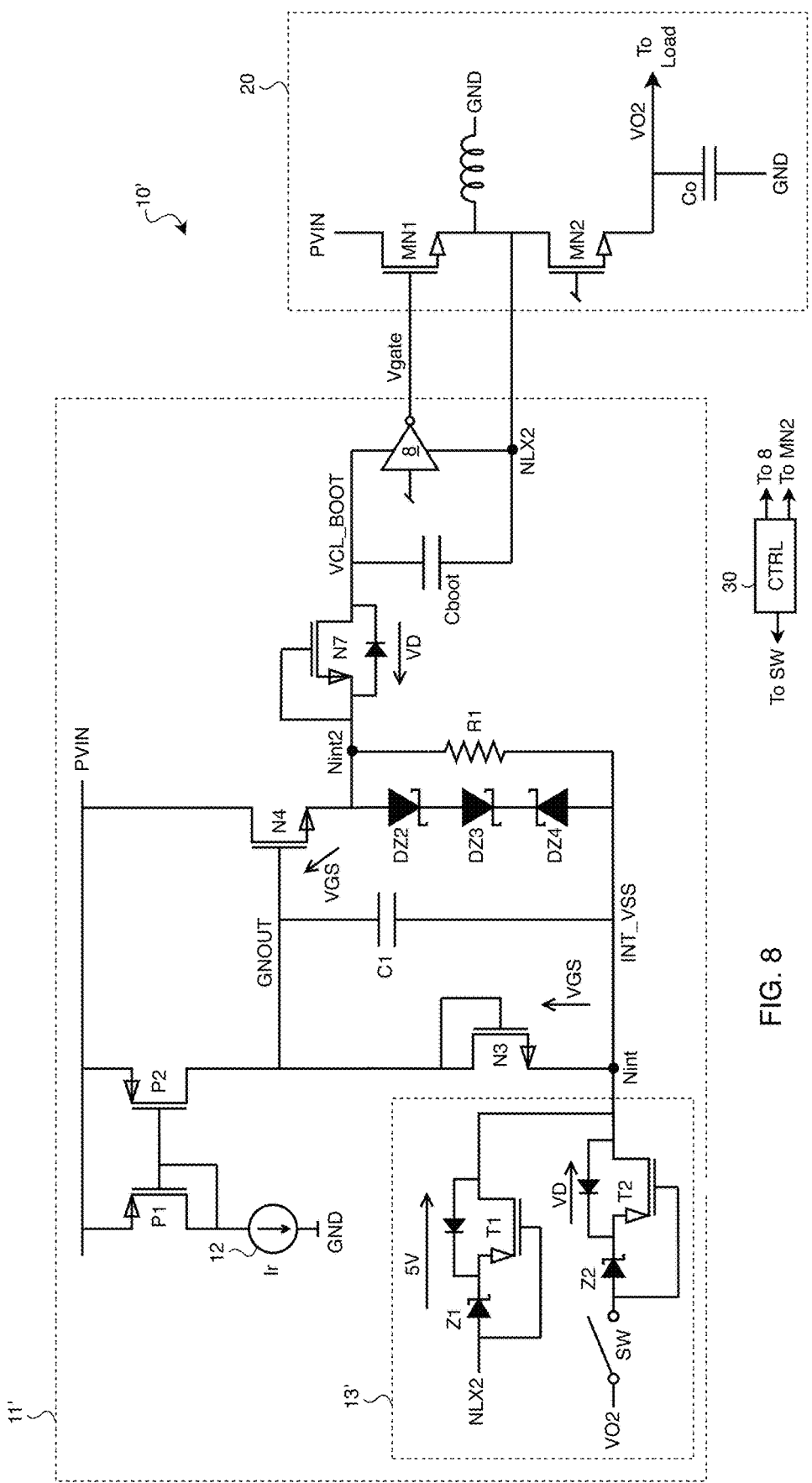
FIG. 8 is a schematic diagram of another embodiment of an inverse buck-boost DC-DC converter disclosed herein utilizing a high-side NMOS transistor, with a newly designed bootstrap circuit being used to generate the gate voltage for the high-side NMOS transistor.

With reference to FIG. 8, another embodiment of the DC-DC converter 10' is now described. The power section 20 and control circuitry 30 remain unchanged. The changes in the bootstrap circuit 11' are that the transistors T1, T2 within the clamp circuit 13' (corresponding to transistors N1, N2 in FIG. 5) are p-channel transistors, the Zener diode Z1 replaces the Zener diode DZ1 in FIG. 5, and the presence of the Zener diode Z2. In greater detail, p-channel transistor T1 has its drain coupled to node Nint, its source coupled to the cathode of Zener diode Z1, and its gate coupled to node NLX2. The Zener diode Z1 has its cathode coupled to the source of transistor T1 and its anode coupled to node NLX2. P-channel transistor T2 has its drain coupled to node Nint, its source coupled to the cathode of Zener diode Z2, and its gate coupled to the anode of the Zener diode Z2. The anode of the Zener diode Z2 is selectively coupled to the voltage VO2 by switch SW. Notice that the drain of p-channel transistor P2 is directly electrically connected to the drain of diode coupled transistor N3.

During on-times Ton, the control circuitry 30 closes the switch SW, enabling the voltage INT_VSS to remain connected to ~5V+VO2, facilitating proper operation of the power section 20 during on-times Ton. In particular, current Ir is injected through diode coupled transistor N3 to node Nint, causing the voltage INT_VSS to rise. During on-times Ton, voltage VO2 is below voltage VLX2 in magnitude, therefore as the voltage INT_VSS rises to VO2+VD (with VD being the forward voltage of the body diode of transistor T2), the body diode of transistor Z2 will activate, and current starts to flow from node Nint to the output VO2 through the transistor T2 and Zener diode Z2, clamping the voltage INT_VSS to (~5V)+VO2 due to the voltage formed across the Zener diode Z2 (~5V). The voltage GNOUT at the gate of transistor N4 will be set to (~5V)+VO2+VGS1, and in turn the voltage at node Nint2 will be set to (~5V)+VO2+ VGS1-VGS2, with the voltage VGS1 being the gate to source voltage of transistor N3 and the voltage VGS2 being the gate to source voltage of transistor N4. This sets the voltage VCL_BOOT to (~5V)+VO2+VGS1-VGS2-VD, with VD here being the forward voltage of the body diode of transistor N7. The bootstrap capacitor Cboot will discharge as the driver 8 draws current as it generates the gate drive signal Vgate for the transistor MN1. The voltages VGS1 and VGS2 are sized so that VGS1-VGS2-VD≈0.

During off-times Toff in CCM, voltage VLX2 remains below output voltage VO2. This means that the current Ir is injected into the diode coupled transistor N3 and in turn to node Nint, causing the voltage INT_VSS to rise. As the voltage INT_VSS rises to VLX2+VD, the body diode of transistor T1 will activate, and current starts to flow from node Nint, through Zener diode Z1, generating ~5V between the gate and source of transistor T1, turning on transistor T1. This sets the voltage INT_VSS to (~5V)+VLX2, and sets the voltage GNOUT at the gate of transistor N4 to (~5V)+ VLX2+VGS1, with the voltage VGS1 being the gate to source voltage of transistor N3. This in turn sets node Nint2 to VLX2+(~5V)+VGS1-VGS2, with the voltage VGS2 being the gate to source voltage of transistor N4. It follows then that this sets the bootstrap voltage VCL_BOOT to VLX2+(~5V)+VGS1-VGS2-VD, with the voltage VD being the voltage across the body diode of transistor N7. Voltages VGS1 and VGS2 are sized so that VGS1-VGS2-VD≈0.

During off-times in DCM and in pulse skip mode, the switch SW is opened by the control circuitry 30. This is because once low-side conduction ceases, the output voltage VLX2 will rise to ground and therefore the voltage VLX2 will cease to be below VO2. Therefore, to enable the current to flow through the body diode of transistor N1 to node NLX2 (instead of flowing through the body diode of transistor N2 to VO2), switch SW is opened. Through this scheme, voltage VLX2 rises and voltage INT_VSS rises accordingly, therefore dynamically adapting to the voltage VLX2— thus the bootstrap voltage VCL_BOOT remains at VLX2+5V despite the output voltage VO2 changing during operation.

Figure 9:
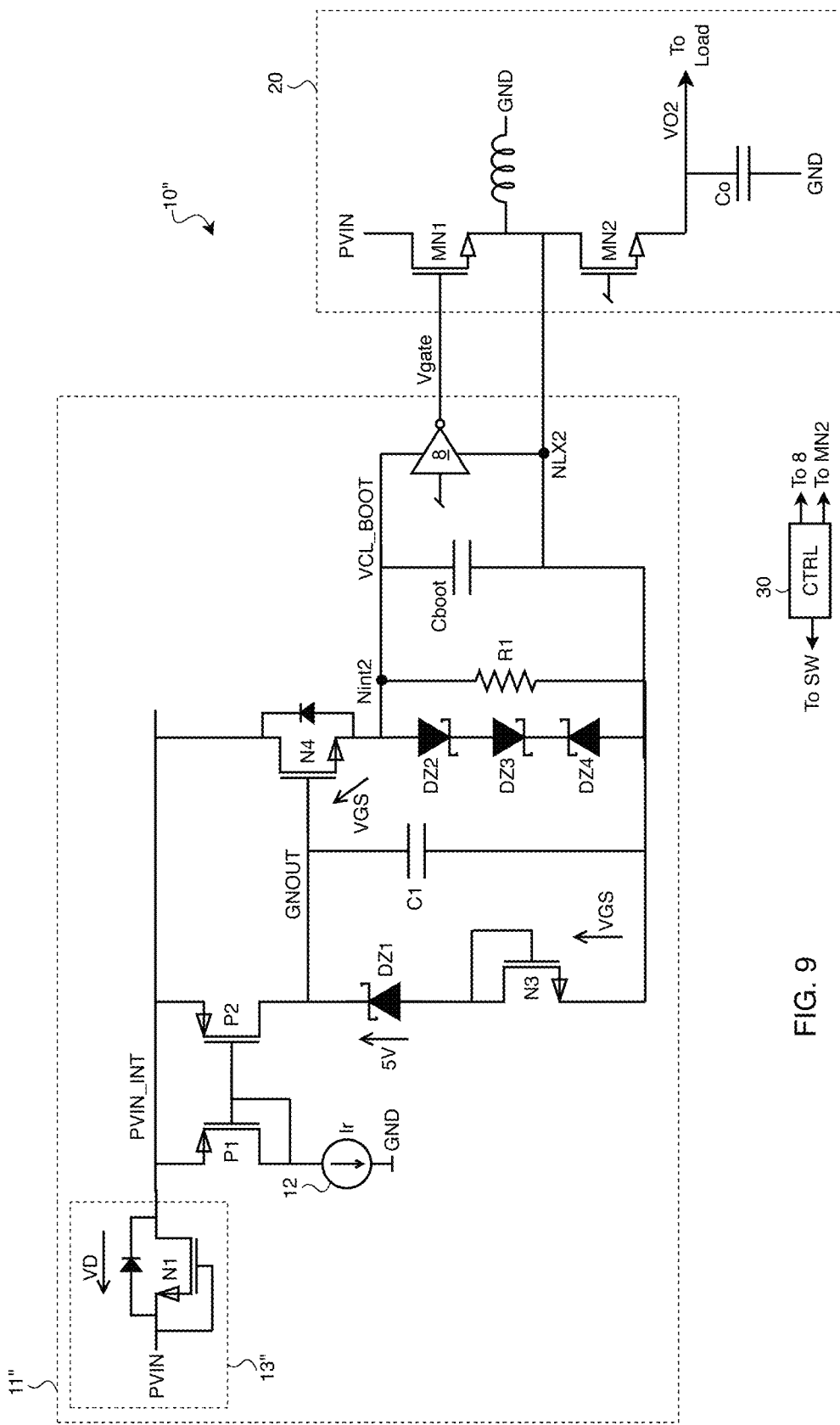
FIG. 9 is a schematic diagram of yet another embodiment of a inverse buck-boost DC-DC converter disclosed herein utilizing a high-side NMOS transistor, with a newly designed bootstrap circuit being used to generate the gate voltage for the high-side NMOS transistor.

With reference to FIG. 9, another embodiment of the DC-DC converter 10" is now described. The power section 20 and control circuitry 30 remain unchanged. The changes in the bootstrap circuit 11" are that the transistor N2 from FIG. 5 has been removed, as has transistor N7. In addition, here, the clamp circuit 13" serves to generate a virtual power supply voltage PVIN INT that does not fall below PVIN-Vd during operation.

The clamp circuit 13" includes transistor N1 now having its drain coupled to the virtual power supply voltage PVIN INT (to which the sources of p-channel transistors P1, P2 and the drain of n-channel transistor N4 are coupled) and its source coupled to the input DC voltage PVIN.

In operation, the voltage GNOUT at the gate of transistor N4 is set to (~5V)+VLX2+VGS1, with the voltage VGS1 being the gate to source voltage of transistor N3. This sets the voltage VCL_BOOT to (~5V)+VLX2+VGS1-VGS2, with the voltage VGS1 being the gate to source voltage of transistor N3 and the voltage VGS2 being the gate to source voltage of transistor N4.

During off-times Toff regardless of mode, the voltage VLX2 is below ground, and therefore VCL_BOOT<PVIN. This causes the diode coupled transistor N1 to become forward biased to charge node PVIN INT to PVIN-Vd. Set input DC voltage PVIN to be equal to the virtual power supply voltage PVIN INT.

During off-times in DCM and skip-mode, once low-side conduction stops, voltage VLX2 rises from the output voltage VO2 to ground and due to the large capacitance of the bootstrap capacitor Cboot, the voltage VCL_BOOT follows and rises from (~5V)+VO2 to (~5V)+GND. This in turn causes transistor N4 to act as a diode, with current therefore flowing from VCL_BOOT through transistor N4. In this phase, transistor N1 acts as a turned-off diode, connecting PVIN INT to VCL_BOOT. This results in the virtual power supply voltage PVIN INT rising accordingly as the voltage VLX2 rises, maintaining the desired ~5V between voltages VCL_BOOT and VLX2.

Figure 10:
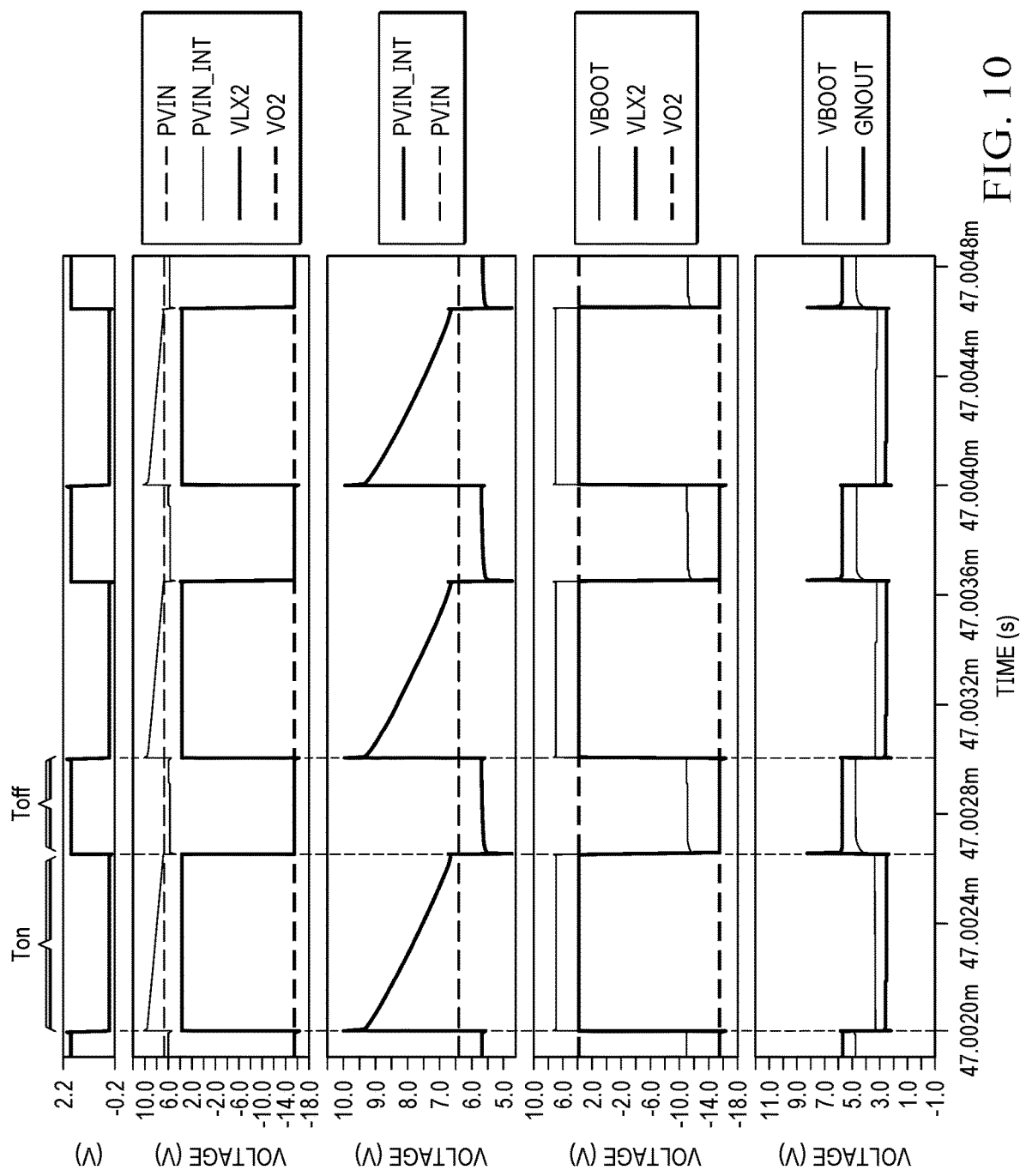
FIG. 10 is a graph showing voltages of the converter of FIG. 9 in operation in continuous conduction mode.

Graphs showing details of operation in a sample cycle in CCM may be found in FIG. 10. Observe that during the on-time Ton, the voltage PVIN INT remains above the input DC voltage PVIN in magnitude, and that during the off-time Toff, the voltage PVIN INT falls one diode's forward voltage (~0.7V) below the input DC voltage PVIN in magnitude. As can be observed, PVIN INT tracks VLX2, thereby maintaining the desired ~5V between voltages VCL_BOOT and VLX2. Also of interest is that the bootstrap capacitor Cboot is recharged quickly during off-times Toff because the voltage GNOUT falls as the voltage VLX2 falls.

Figure 11:
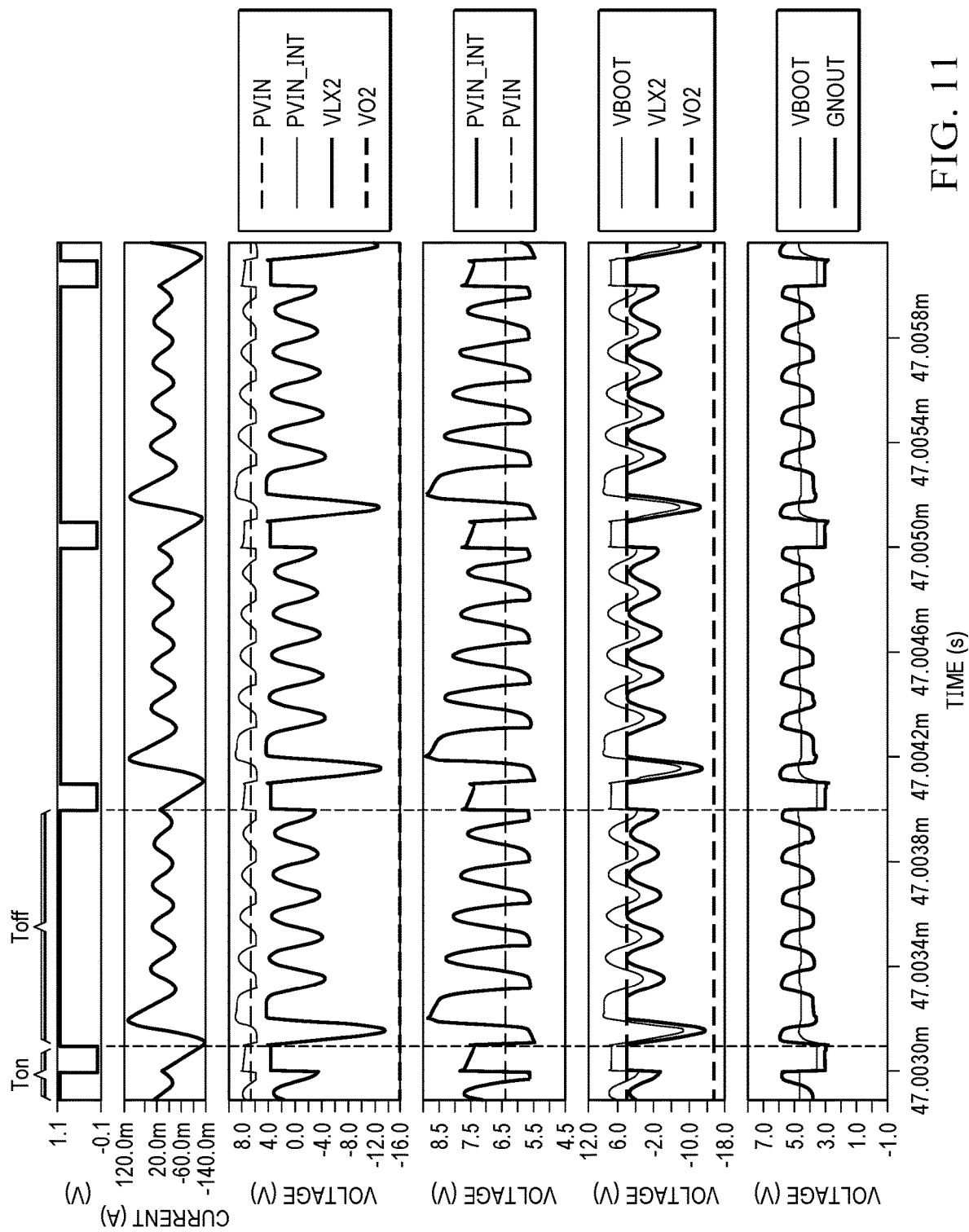
FIG. 11 is a graph showing voltages of the converter of FIG. 9 in operation in discontinuous conduction mode.

Graphs showing details of operation in a sample cycle in DCM may be found in FIG. 11. Observe that during the on-time Ton, the voltage PVIN INT is above the DC output voltage PVIN due to coupling with the bootstrap capacitor Vboot, but that during off-times, the voltage PVIN INT oscillates about the input DC voltage PVIN as it tracks VLX2, maintaining the desired ~5V between voltages VCL_BOOT and VLX2.

Advantages of the DC-DC converters 10, 10', 10" described hereinabove include quick recharge time because the clamp circuit remains coupled to the bootstrap capacitance Cboot without the usage of a bypass switch, avoiding switching delays that occur with the prior art. In addition, area consumption is less than prior art designs due to the lack of multiple switches. For the same reasons, system complexity is less than prior art designs.

Finally, it is clear that modifications and variations may be made to what has been described and illustrated herein, without thereby departing from the scope of this disclosure, as defined in the annexed claims.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A DC-DC converter, comprising:
a power section including at least a high-side transistor and a low-side transistor coupled in series between an input voltage node and an output voltage node, wherein the high-side transistor has a gate that is driven by a gate drive voltage;
a bootstrap circuit comprising:
a gate driver having a power supply terminal coupled to a bootstrap output node and a reference supply terminal coupled to a tap node between the high-side transistor and the low-side transistor, the gate driver configured to receive a high-side control signal and generate the gate drive voltage in response thereto;
a bootstrap capacitor coupled between the bootstrap output node and the tap node;
a clamp circuit configured to set an intermediate voltage at a first intermediate node to be equal to a lesser of a tap voltage at the tap node and an output voltage at the output voltage node;
a current source configured to source a reference current to a control node;
a voltage drop circuit coupled between the control node and the first intermediate node, the voltage drop circuit generating a control voltage at the control node as a function of the intermediate voltage;
a source follower configured to buffer the control voltage to a second intermediate node; and
a bootstrap output transistor coupled between the second intermediate node and the bootstrap output node, the bootstrap output transistor arranged so as to set a bootstrap voltage across the bootstrap capacitor to be equal to a target voltage that is referenced to the tap voltage; and
control circuitry configured to generate the high-side control signal, a low-side control signal for the low-side transistor, and a clamp control signal for the clamp circuit so as to operate the DC-DC converter to generate the output voltage at the output voltage node from an input voltage at the input voltage node.

2. The DC-DC converter of claim 1, wherein the clamp circuit comprises:
a first n-channel transistor having a drain coupled to the tap node, a source coupled to the first intermediate node, and a gate coupled to the first intermediate node; and
a second n-channel transistor having a drain selectively coupled to output voltage node by a switch, a source coupled to the first intermediate node, and a gate coupled to the first intermediate node, wherein the switch is controlled by the clamp control signal so that the switch is opened during off-times in discontinuous conduction mode (DCM) and pulse skip mode (PSM) but closed during off-times in continuous conduction mode (CCM) and during on-times in DCM, PSM, and CCM.

3. The DC-DC converter of claim 2, wherein the voltage drop circuit comprises:
a Zener diode having a cathode coupled to the control node, and an anode; and
a diode coupled transistor coupled between the anode of the Zener diode and the first intermediate node.

4. The DC-DC converter of claim 1, wherein the clamp circuit comprises:
a first p-channel transistor having a drain coupled to the first intermediate node, a gate coupled to the tap node, and a source coupled to a cathode of a first Zener diode, with an anode of the first Zener diode being coupled to the tap node;
a second p-channel transistor having a drain coupled to the first intermediate node, a gate coupled to an anode of a second Zener diode, and a source coupled to a cathode of the second Zener diode; and
a switch coupled between the anode of the second Zener diode and the output voltage node, wherein the switch is controlled by the clamp control signal so that the switch is opened during off-times in discontinuous conduction mode (DCM) and pulse skip mode (PSM) but closed during off-times in continuous conduction mode (CCM) and during on-times in DCM, PSM, and CCM.

5. The DC-DC converter of claim 4, wherein the voltage drop circuit comprises a diode coupled transistor coupled between the control node and the first intermediate node.

6. The DC-DC converter of claim 1, wherein the current source comprises:
a reference current sink configured to sink the reference current; and
a current mirror having an input from which the reference current is sunk and an output coupled to the control node so that the reference current is sourced to the control node.

7. The DC-DC converter of claim 1, wherein the source follower comprises an n-channel transistor having a drain coupled to the input voltage node, a source coupled to the second intermediate node, and a gate coupled to the control node.

8. The DC-DC converter of claim 7, wherein the source of the n-channel transistor is coupled to the first intermediate node through a diode circuit connected between the first intermediate node and the second intermediate node; and further comprising a resistor coupled between the first intermediate node and the second intermediate node.

9. The DC-DC converter of claim 8, wherein the diode circuit comprises:
a first Zener diode having an anode coupled to the second intermediate node;
a second Zener diode having an anode coupled to a cathode of the first Zener diode; and
a third Zener diode having a cathode coupled to a cathode of the second Zener diode and an anode coupled to the first intermediate node.

10. The DC-DC converter of claim 1, wherein the power section includes an inductor coupled between the tap node and ground such that the power section forms an inverting buck-boost converter.

11. The DC-DC converter of claim 1, wherein the bootstrap output transistor comprises an n-channel transistor having a source coupled to the second intermediate node, a drain coupled to the bootstrap output node, and a gate coupled to the second intermediate node.

12. A DC-DC converter, comprising:
a power section including at least a high-side transistor and a low-side transistor coupled in series between an input voltage node and an output voltage node, wherein the high-side transistor has a gate that is driven by a gate drive voltage;
a bootstrap circuit comprising:
a gate driver having a power supply terminal coupled to a bootstrap output node and a reference supply terminal coupled to a tap node between the high-side transistor and the low-side transistor, the gate driver configured to receive a high-side control signal and generate the gate drive voltage in response thereto;
a bootstrap capacitor coupled between the bootstrap output node and the tap node;
a clamp circuit coupled between a power supply node and the input voltage node, the clamp circuit configured to set an input voltage at the input voltage node to be equal to a target voltage that is referenced to a tap voltage at the tap node;
a current source configured to source a reference current to a control node;
a voltage drop circuit coupled between the control node and a first intermediate node, the voltage drop circuit generating a control voltage at the control node as a function of an intermediate voltage at the first intermediate node; and
a transistor coupled between the input voltage node and the first intermediate node, with a control terminal of the transistor being coupled to the control node; and
control circuitry configured to generate the high-side control signal and a low-side control signal for the low-side transistor so as to operate the DC-DC converter to generate an output voltage at the output voltage node from an input voltage at the input voltage node.

13. The DC-DC converter of claim 12, wherein the clamp circuit comprises an n-channel transistor having a source coupled to the power supply node, a drain coupled to the input voltage node, and a gate coupled to the power supply node.

14. The DC-DC converter of claim 12, wherein the voltage drop circuit comprises:
a Zener diode having a cathode coupled to the control node, and an anode; and
a diode coupled transistor coupled between the anode of the Zener diode and the first intermediate node.

15. The DC-DC converter of claim 12, wherein the current source comprises:
a reference current sink configured to sink the reference current; and
a current mirror having an input from which the reference current is sunk and an output coupled to the control node so that the reference current is sourced to the control node.

16. The DC-DC converter of claim 12, wherein the transistor within the bootstrap circuit comprises an n-channel transistor having its drain coupled to the input voltage node, its source connected to the bootstrap output node, and its gate coupled to the control node.

17. The DC-DC converter of claim 16, wherein the source of the n-channel transistor is coupled to the first intermediate node through a diode circuit connected between the first intermediate node and the bootstrap output node; and further comprising a resistor coupled between the first intermediate node and the bootstrap output node.

18. The DC-DC converter of claim 17, wherein the diode circuit comprises:
a first Zener diode having an anode coupled to the bootstrap output node;
a second Zener diode having an anode coupled to a cathode of the first Zener diode; and
a third Zener diode having a cathode coupled to a cathode of the second Zener diode and an anode coupled to the first intermediate node.

19. The DC-DC converter of claim 12, wherein the power section includes an inductor coupled between the tap node and ground such that the power section forms an inverting buck-boost converter.

20. A method of operating a DC-DC converter, comprising:
generating high-side and low-side control signals for high-side and low-side transistors of a power section so as to convert an input DC voltage to an output DC voltage;
wherein generating the high-side control signal is performed by:
during on-times of the DC-DC converter during which the high-side transistor is on, powering a gate driver with a bootstrap capacitor and generating the high-side control signal with the gate driver; and
during off-times of the DC-DC converter during which the high-side transistor is off, recharging the bootstrap capacitor by:
establishing a voltage differential across the bootstrap capacitor as a difference between a bootstrap voltage and a voltage at a tap between the high-side and low-side transistors of the power section; and
causing the bootstrap voltage to follow a lesser of the output DC voltage and the voltage at the tap during the off-times so that the voltage differential remains sufficient to suitably charge the bootstrap capacitor.

* * * * *